July 14, 1959  E. F. MAXWELL  2,894,765
FARM IMPLEMENT HITCH
Filed Sept. 24, 1957  2 Sheets-Sheet 1
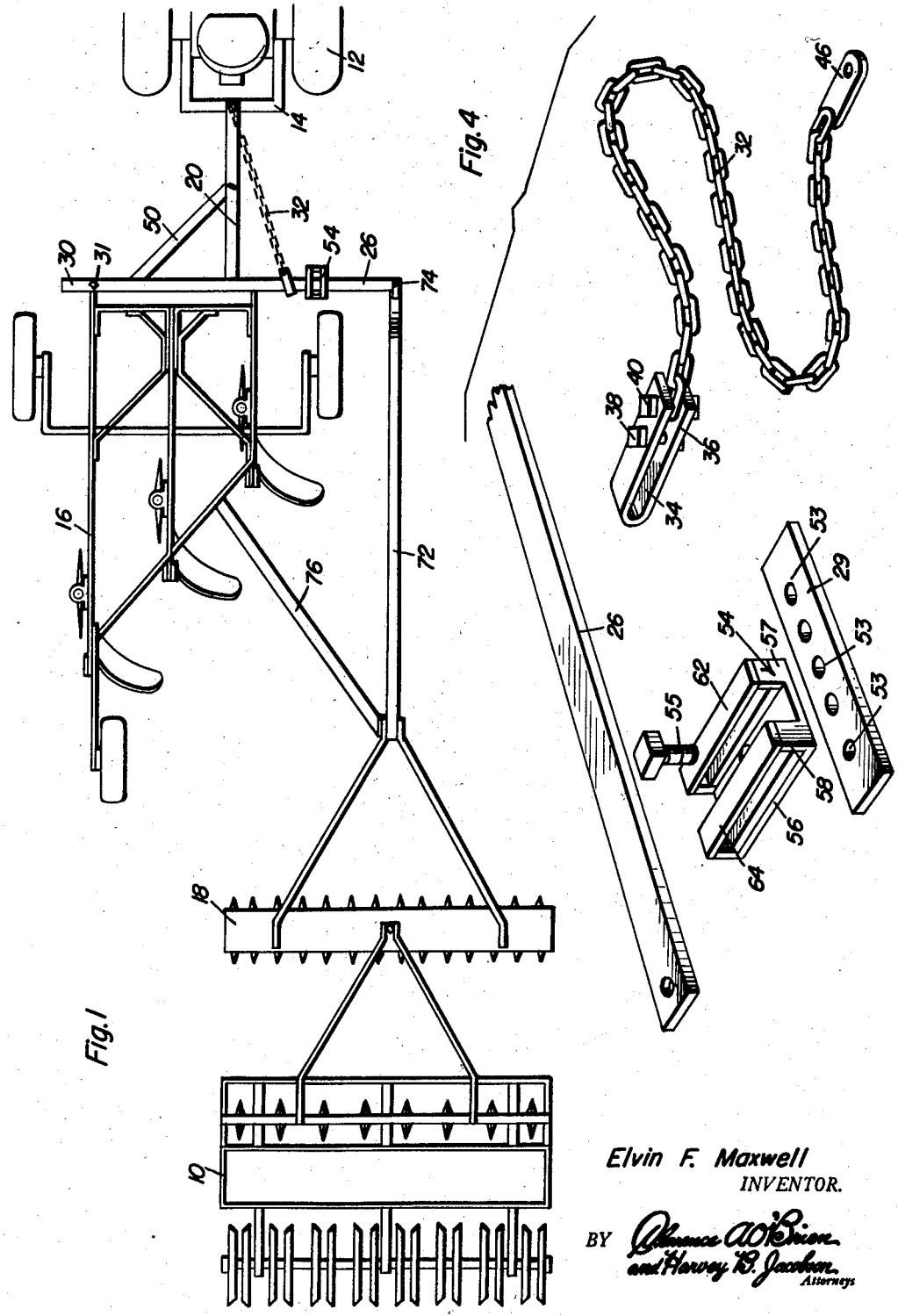
Elvin F. Maxwell
INVENTOR.

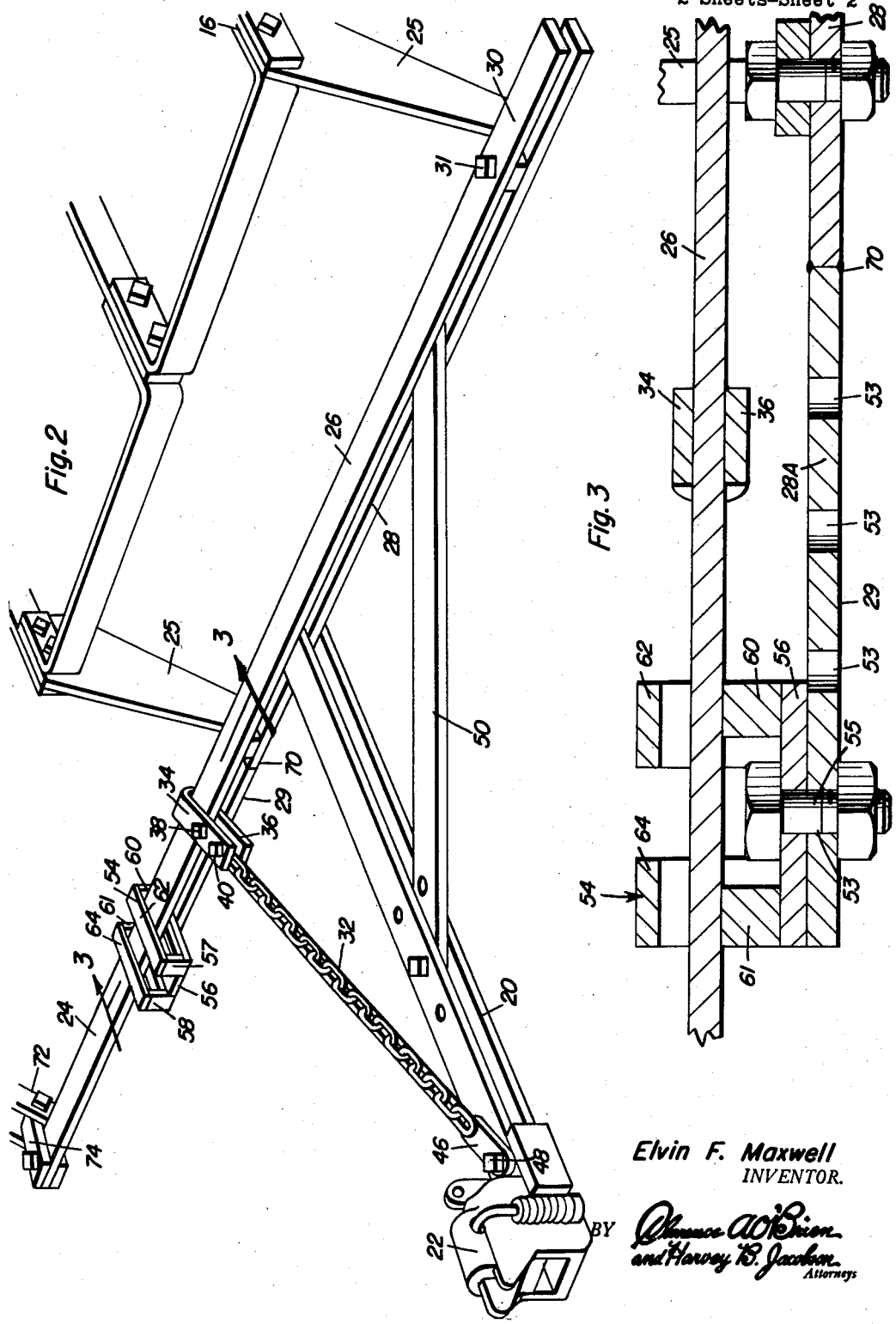

2,894,765
FARM IMPLEMENT HITCH

Elvin F. Maxwell, Fessenden, N. Dak.

Application September 24, 1957, Serial No. 685,892

3 Claims. (Cl. 280—472)

This invention relates to a farm implement hitch and more particularly to a hitch to eliminate side draft caused by the drawn implement.

An object of the present invention is to provide a hitch that will eliminate the side draft on a plow while pulling a pony drill. With high speed bottoms making it necessary to keep the pony drill so far to the left or out in the plowing, the side pressures on the plow wear out the land sides and furrow wheel.

It is almost impossible to keep a plow running straight especially in soft ground. A further object of this invention is to provide a simplified hitch which creates the following conditions in a pony drill: the hitch places all of the pull directly behind the drawbar on the tractor, any side draft on this hitch is on the outside corner of the plow. The result is that there is a tendency to relieve the pressure on the land sides of the plows. As a necessary result there is no pressure other than the normal plow's weight on the wheels and plow bottoms.

Inasmuch as the invention does away with the unwanted side drafts there is no practical limit to the amount of load that can be pulled with the hitch and still leave the plow work free and arrange to pull straight.

Other objects and features of importance will become apparent in following the description of the illustrated form of the invention.

Figure 1 is a fragmentary top view of a tractor drawing a typically commercially available pony drill hook-up which includes plow, disk gang and drill;

Figure 2 is a perspective view of a hitch between the plow and tractor drawbar of Figure 1 and showing the invention in use;

Figure 3 is an enlarged sectional view taken on the line 3—3 of Figure 2; and

Figure 4 is a perspective view of the parts which go into the construction of the invention.

In a typical farming operation where a pony drill 10 is used, several manufacturers' suggested organization will include a tractor 12 having drawbar 14 which pulls plow 16 behind which there is the ganged disk 18 and the drill 10. With the organization shown in Figure 1, there is too much side draft on the plow 16. The pony drill 10 has to assume a position too far out on the plowing and is pulled at an angle during ordinary farming operations. This causes difficulty in maneuvering and steering and causes premature wear of the plows.

Tongue 20 of plow 16 has a conventional spring coupling 22 at one end by which to connect to the tractor drawbar 14 in the usual manner. The plow drawbar 24 has upper and lower plates 26 and 28 respectively that are spaced slightly from each other. Plate 28 is standard equipment and is bolted to the arms 25 of plow 16. Since plate 28, as supplied by the manufacturer is not long enough to practice the invention, extension 29 is welded to one end. If desired, plate 26 could in original manufacture be made sufficiently long. Plate 26 is an important part of the invention and is secured at corner 30 of drawbar plate 28 by bolt 31 fairly snug but can pivot somewhat. Plate 26 extends through limit box 54 on extension 29. In achieving the principal object of the invention, all of the pull is placed directly behind the tractor drawbar 14 and at the coupling 22. Any side draft is on the outside corner 30 of the plow 16. This has a tendency to relieve the pressure on the land sides of the plow, leaving no pressure other than the normal plow's weight on the wheels and plow bottoms.

The means for achieving this consists of a flexible elongated element, for example chain 32 with a clevis 34 at one end. The clevis is constructed of a U-shaped hook 36 that has bolts 38 and 40 passed through the sides thereof. Chain 32 is hooked to one of these bolts. The disposition of the clevis is on the upper drawbar plate 26 with side 36 in between the upper and lower plates 26 and 28. Clevis 36 is secured to a selected part of drawbar plate 26. The opposite end of the chain 32 has a mounting plate 46 through which there is a hole so as to accommodate the bolt 48. This bolt attaches to the tongue 20 very close to the spring coupling 22. Chain 32 is on the side of the tongue 20 opposite to the diagonal brace 50 extending between the plow drawbar plate 28 and tongue 20. Brace 50 is attached diagonally to tongue 20 and drawbar plate 28, assuring a firm connection between tongue 20 and plow 16.

Limit box or stop 54 is adjustably carried by the plow drawbar extension 29, and is held in place by bolt 55 located in a hole in the limit box and a selected hole 53 in extension 29. The limit box or stop consists of a bottom plate 56 having two front uprights 57 and 58 together with two rear uprights 60 and 61. The front uprights are located in front of the pair of plates 26 and 28, and the rear uprights 60 and 61 are behind these plates. Top cross members 62 and 64 are attached to the upper ends of pairs of uprights and are parallel to the bottom 56. Inasmuch as front and rear uprights are present, the upper cross members are above top plate 26 and the parallel bottom 56 is between the plates 26 and 28, the pivotal movement of drawbar plate 26 about the axis of bolt 31 is constrained.

Stop 54 is at a position laterally beyond what is ordinarily the end 70 of the bottom drawbar plate 28. Instead of connecting pony drill tongue 72 to the end of drawbar plate 28, tongue 72 is connected by hitch 74 to the outer end of drawbar plate 26. Lateral thrust brace 76 extends from tongue 72 to plow 16.

As the pony drill is pulled through the field the pull for drill 10 and disc 18 is taken by drawbar plate 26 which is pivoted at the landside of the plow drawbar. The flexible member 32 forms a reaction member within which some of the forces of this pull are taken and applied to tongue 20 in order to prevent the unwanted side draft of the plows. As the plow 16 tends to move to the outside, the flexible member 32 takes up some of the misdirected force while at the same time some of this pull may be transmitted to drawbar plate 28 by stop 54.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a pony drill which includes an implement drawn behind and to one side of a plow wherein the plow has a plow drawbar and a tongue connected to the plow drawbar intermediate the ends of the plow drawbar, and further wherein the tongue has a coupling which connects to a tractor drawbar, means for reducing side draft comprising an elongate element, a drawbar plate pivoted near one end to said plow drawbar on the side of the plow opposite to the implement, means attaching one end of said element to said drawbar plate, means for anchoring the opposite end of said elongate element to said tongue, means that are laterally displaceable along the length of the plow drawbar for limiting the extent of pivotal movement of said drawbar plate and for transmitting some of the pull of the implement to said plow drawbar, and an implement tongue attached to said drawbar plate by which to pull the implement.

2. In a pony drill which includes an implement drawn behind and to one side of a plow wherein the plow has a plow drawbar and a tongue connected to the plow drawbar intermediate the ends of the plow drawbar, and further wherein the tongue has a coupling which connects to a tractor drawbar, means for reducing side draft comprising an elongate element, a drawbar plate pivoted near one end to said plow drawbar on the side of the plow opposite to the implement, means attaching one end of said element to said drawbar plate, means for anchoring the opposite end of said elongate element to said tongue, means that are laterally displaceable along the length of the plow drawbar for limiting the extent of pivotal movement of said drawbar plate and for transmitting some of the pull of the implement to said plow drawbar, an implement tongue attached to said drawbar plate by which to pull the implement, and a brace attached to said implement tongue and said plow.

3. The combination of claim 1 wherein said means for limiting the extent of pivotal movement of said drawbar plate comprise a box mounted on said plow drawbar, said box having a passageway through which said drawbar plate is passed.

References Cited in the file of this patent

UNITED STATES PATENTS

| 1,198,853 | Kirch | Sept. 19, 1916 |
| 1,655,564 | Rees | Jan. 10, 1928 |
| 1,830,739 | Lang | Nov. 3, 1931 |
| 1,840,754 | Tichota | Jan. 12, 1932 |
| 2,005,525 | Tichota | June 18, 1935 |
| 2,389,094 | Tichota | Nov. 13, 1945 |
| 2,525,917 | Leighnor | Oct. 17, 1950 |
| 2,780,478 | Forsyth | Feb. 5, 1957 |

FOREIGN PATENTS

| 512,749 | Great Britain | Sept. 25, 1939 |